(12) United States Patent
Cloonan et al.

(10) Patent No.: US 9,197,559 B1
(45) Date of Patent: Nov. 24, 2015

(54) ADAPTIVE STREAMING USING NON-LOCAL INFORMATION

(75) Inventors: Thomas J. Cloonan, Lisle, IL (US); Carol J. Ansley, Johns Creek, GA (US); Marcin Morgos, Warsaw (PL); Stephen J. Kraiman, Doylestown, PA (US); Daniel Torbet, Westminster, CO (US); Ian Wheelock, Cork (IE); Jeffrey Joseph Howe, West Chicago, IL (US); William Turner Hanks, Carol Stream, IL (US); Marek Bugajski, Norcross, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 410 days.

(21) Appl. No.: 13/459,810

(22) Filed: Apr. 30, 2012

Related U.S. Application Data

(60) Provisional application No. 61/481,109, filed on Apr. 29, 2011.

(51) Int. Cl.
*H04L 12/801* (2013.01)
*H04L 12/24* (2006.01)

(52) U.S. Cl.
CPC ............... *H04L 47/10* (2013.01); *H04L 41/12* (2013.01)

(58) Field of Classification Search
CPC ............ H04L 41/5003; H04L 41/5009; H04L 41/5025; H04L 47/10; H04L 41/0896; H04L 41/12; H04L 43/08; H04L 43/0876; H04L 45/123
USPC .................................................... 709/223, 227
See application file for complete search history.

(56) References Cited

U.S. PATENT DOCUMENTS

| | | | | |
|---|---|---|---|---|
| 8,089,888 B2* | 1/2012 | Krishnamurthi et al. | ...... | 370/250 |
| 8,194,643 B2* | 6/2012 | Bugenhagen | ................. | 370/352 |
| 8,289,965 B2* | 10/2012 | Bugenhagen et al. | ........ | 370/392 |
| 8,619,600 B2* | 12/2013 | Morrill et al. | ................. | 370/252 |
| 8,717,911 B2* | 5/2014 | Bugenhagen et al. | ........ | 370/252 |

\* cited by examiner

*Primary Examiner* — Kristie Shingles
(74) *Attorney, Agent, or Firm* — Troy A. Van Aacken (57) ABSTRACT

Methods, systems, and apparatuses can provide for adaptive streaming using non-local information. Non-local information identifying usage statistics associated with a network service group can be collected and used to derive session parameters associated with each of a plurality of sessions within the network service group. The non-local information can also be updated and the updated non-local information can be used to dynamically adjust the session parameters.

20 Claims, 3 Drawing Sheets

ADAPTIVE STREAMING USING NON-LOCAL INFORMATION

CROSS REFERENCE TO RELATED APPLICATION

This application is a non-provisional of, and claims the benefit of U.S. Provisional Application Ser. No. 61/481,109, entitled "Improved Adaptive Streaming through the use of Non-Local Information," filed on Apr. 29, 2011, and which is hereby incorporated herein by reference in its entirety.

TECHNICAL FIELD

This disclosure relates to adaptive streaming for video.

BACKGROUND

The use of internet protocol (IP) to transport digital video is moving rapidly from being based today on a simple, one-way user datagram protocol (UDP). The emerging delivery methods do not use proprietary transport techniques developed by content coding vendors (e.g., Adobe real-time messaging protocol (RTMP)) or inefficient schemas that are based on progressive downloads of very large content files. The new methods embrace open standards and rely on transporting a series of small files (that when combined comprise the entire content asset) over a hypertext transfer protocol (HTTP) transport. This method of transporting small segments (or fragments) of digital IP video content can be identified as the Segmented HTTP Transport (SHT) method.

The various SHT methods typically use a construct called a manifest file to tell the client how to request the segments in the appropriate order. The manifest file for a particular piece of video content (e.g., a movie, television show, etc.) might contain information describing the uniform resource locators (URLs) and available resolutions for the video content, as well as information that can be used to point to the start of a particular segment of digital IP video. The manifest file is typically transmitted from the IP video source down to the IP video client devices before the transport of the small files (created from digital IP video segments) can commence. The small files are then requested by the client devices and are downloaded from the source servers to the client buffer where they are assembled into a continuous flow, sent to the decoder, and subsequently to the display where (ideally) an uninterrupted viewing experience is created. The client buffer provides a steady play-out for the often different sized segments, since they are asynchronous packets delivered over an IP network. Because the jitter and delay for each segment as it traverses the IP network may vary, the client buffer acts as an elastic storage element that can absorb and hold transient bursts of many segments and can play out a smooth-rate stream to the video rendering engine, or it can absorb transient periods with no segment arrivals and can still play out a smooth-rate stream to the video rendering engine. One or more fragments can be delivered to the client buffer before the play-out and rendering begins, and usually the client buffer is filled to a level that consumes roughly half of its total depth to provide the elastic storage function.

Another feature that can be layered on top of the SHT systems which augments the robustness of the schema can be called adaptive streaming. Rather than encoding content using a single quality/bit rate setting for streaming or downloading, a method of simultaneous transcoding of the single source content into multiple bit rates can be used. This process creates and stores (e.g., at the video source) multiple versions of the same video at different resolutions and play-out bit rates. These multiple versions are time-equal and can be dynamically delivered to the same play-out device depending on the quality of its connection to the network. In this instance, the manifest file construct is extended with information that allows the client to play back at any of the encoded qualities. These types of augmented SHT systems that utilize adaptive streaming techniques can be identified as adaptive SHT systems.

The video client uses a variety of algorithms to determine which play-out quality to choose at any given instant in time. If operating conditions such as network congestion cause the client not to be able to receive the content at a previously requested resolution (bit rate) or if the central processing unit (CPU) loading of a multi-tasking play-out is too heavy and causes it to drop video frames, then the video client may request a lower quality version for the next segment(s) in the sequence. Conversely, if the conditions improve (connection quality or CPU loading), the video client may request a higher quality version of the next segment. Because the SHT systems are based on HTTP transport, the requests for particular resolution video segments that are made by the video client are passed to the source servers using standard HTTP GET or POST messages, which are a common component of the well-known HTTP communication protocol.

Most of the aforementioned SHT systems were described for on-demand video content that is pre-stored on a source server long before the viewers would typically request and access the content. Another augmentation of the adaptive SHT systems is provided by a feature called live streaming. In live streaming SHT systems, the broadcasted video programming is changed into point-to-point delivery in an almost real-time fashion. From a logical standpoint, a live streaming SHT system does not appear very different than an on demand SHT system; however from a real world standpoint there are two significant differences: 1) because the piece of content is being encoded in real-time, new segments are being created, so the manifest file is constantly updated, and 2) because the content is being produced and consumed at more or less the same time, the video client is constantly requesting an updated version of the manifest file to get information on how to request the newly added segments of video.

The migration to HTTP transport for point-to-point unicast delivery of IP video brings about a number of benefits over proprietary or a UDP-based transport. HTTP is a standard that is broadly supported by network equipment like routers and customer premise equipment (CPE). Problems related to network address translation (NAT) that can occur with UDP-based transport are not an issue with HTTP, which is based upon transmission control protocol (TCP). While there are multiple proprietary implementations of SHT systems, as long as the SHT systems are well behaved, the content segments can be cached in a traditional edge cache. The use of a content delivery networks (CDNs), which have globally distributed edge caches, provide a generic way to provide cost effective scale for content delivery.

DETAILED DESCRIPTION

In some implementations of this disclosure, systems and methods can operate to provide adaptive streaming for SHT systems using non-local information. While adaptive SHT systems are gaining acceptance and finding applications in both Over-The-Top and Managed IP video deployments, their typical implementations do display several potential problems. Two groups of problems will be disclosed herein.

Figure 1:
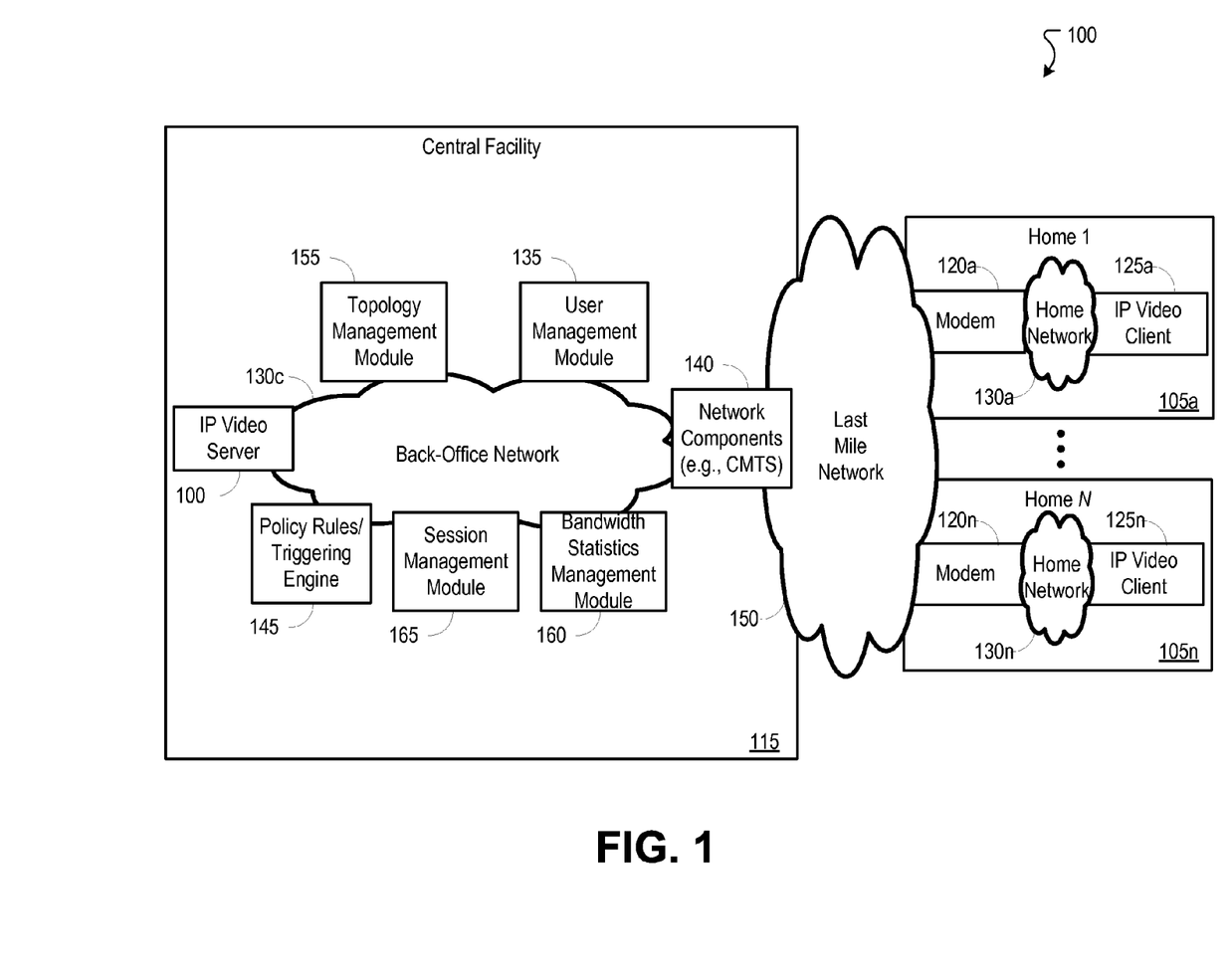
FIG. 1 is a block diagram illustrating an example network environment operable to provide adaptive streaming using non-local information.

FIG. 1 is a block diagram illustrating an example network environment operable to provide adaptive streaming using non-local information. For the discussions below, a channel can be identified as an electrical or optical medium (using a specified amount of spectrum) which can be used to transmit symbols between a source (e.g., video server 100) and one or more destinations (e.g., home(s) 105a-105n). Messages can include multiple symbols. Example messages can be packets carrying high-speed data (HSD) traffic, packets carrying VoIP traffic, or packets carrying IP video traffic. A single channel can carry messages in both directions, but in typical systems channels are dedicated to carrying messages in one direction. Thus, different frequency portions of the spectrum can be used to separate the upstream message channels from the downstream message channels. In some implementations, the channels described herein can provide "last-mile" network 150 connectivity between a central facility 115 owned by the service provider (e.g., a head-end (HE) for cable service providers or a central office (CO) for telecommunications (telco) service providers) and a group of homes 105a-n (e.g., a service group). Channels carrying messages from the central facility 115 towards the homes 105a-n can be identified as downstream channels, and channels carrying messages from the homes 105a-n towards the central facility 115 can be identified as upstream channels.

There can be one or more channels used to communicate between the central facility 115 and the group of homes 105a-n in a service group. Each home 105a . . . 105n can be connected to one or more channels. Each home that is connected to a channel can be equipped with a transceiver (e.g., a modem 120a . . . 120n). The transceiver can have M transmitters and N receivers, and a selected transmitter or receiver can be individually tuned to operate on a specific channel. For a typical neighborhood, the service provider may run X downstream channels and Y upstream channels throughout the neighborhood. Usually, $M \leq X$ and $N \leq Y$. Thus, one can identify the number of downstream or upstream channels that are accessible to a home, which are the X and Y values, respectively. One can also identify the number of downstream or upstream channels to which a home can be tuned—these numbers are limited to be values that are less or equal to M (for the downstream channels) and less than or equal to N (for the upstream channels). If the channel is a point-to-multipoint channel, then more than one home receiver can be attached to the channel and each could extract the messages from the channel. Typically many messages will compete to use the bandwidth resources of each channel. For downstream channels, arbitration and scheduling algorithms in the central facility can be used to determine which messages will be transmitted first and which messages will be delayed. Delayed messages are stored in buffers within the central facility until they are selected for transmission. For upstream channels, arbitration and scheduling algorithms in the central facility are oftentimes used to determine which messages will be transmitted first and which messages will be delayed. Delayed messages are stored in buffers within the home transceivers until they are selected for transmission. During periods of congestion, delayed messages may build up in the aforementioned buffers, leading to lengthy buffer depths and lengthy delays as the messages wait to be transmitted. These delays can be detected at the receivers and can lead to undesirable performance to the end viewers.

The use of adaptive streaming to dynamically detect bandwidth congestion and/or processor utilization issues and react by dynamically adjusting the quality, resolution, and bit-rate of the IP video stream was a major improvement to the previous techniques, which statically transmitted the IP video stream at one (and only one) resolution and bit-rate once the streaming session was started. Prior to the introduction of adaptive streaming, network congestion or processor overload would usually lead to tiling and other artifacts manifesting themselves on the IP video display element. The addition of adaptive streaming allowed the viewer to get a continually-adjusting video stream without as many artifacts—even in the presence of bandwidth congestion and/or heavy processor loads at the video client. By throttling down the resolution and bit-rate of the requested stream, the client can help reduce the network bandwidth and processing load to ensure that video is continually delivered to the viewer's screen—even if the quality of the delivered IP video is temporarily reduced at times to accommodate the changing load characteristics on the delivery network or the video client's processor.

While adaptive streaming marked a great improvement in the general viewer's Quality of Experience levels within typical IP video delivery networks, there is still room for improvement within future IP video delivery networks. These future improvements should focus on several of the weaknesses in the current adaptive SHT systems that may become more problematic in the more heavily-used systems of the future.

One apparent weakness within the adaptive SHT systems results from the fact that the software algorithms running in the adaptive SHT clients are only cognizant of the performance of their own IP video stream. From that limited information, the SHT systems attempt to infer the amount of congestion that their IP video stream is currently experiencing and attempt to make intelligent decisions about whether to throttle the IP video stream upwards or downwards. Based on their individual estimate of the congestion, these systems use triggers to determine whether to decrease the quality (and bit-rate) of their requested IP video stream or whether to increase the quality (and bit-rate) of their requested IP video stream. In many respects, this triggering decision is made in a vacuum, because the IP video client software has access to a relatively small amount of information regarding the network through which its IP video stream is passing. Thus, the triggering algorithm in the IP video client has essentially a feedback control system working in a vacuum, with few observations into the state of the total system and resources that it is attempting to manage.

There are many global aspects of the total adaptive SHT system that can be helpful to observe when the adaptive stream triggering decisions are being made. For example, a more optimal decision about whether to throttle the quality of a particular stream and associated bit-rate upwards or downwards can be made if the decision was incorporates information such as, but not limited to:

1. A number of channels that are accessible to the viewer's home (e.g., in a DOCSIS environment, this can be a list of the Downstream Channels that are delivered to the cable modem's service group);

2. Identification of the channels that are currently being tuned to by the user's home (e.g., in a DOCSIS 3.0 environment, this can be identified by the receive channel set of the modem);
3. A number of receivers that the user's home modem has;
4. An amount of unused bandwidth capacity that exists on each of the channels that are accessible to the viewer's home (e.g., whether they are channels that the home is tuned to or not);
5. Identification of the channels that the viewer's home can be told to tune (e.g., in a DOCSIS environment, this would utilize DCC or DBC commands from the CMTS to the cable modem);
6. Identification of channels that the user's home is currently tuned to are actually being used to carry data streams, and what is the type of the data that is being carried on each of those channels (e.g., HSD or IP Video or VoIP);
7. Whether the IP Video stream being sent down each channel unicasted to the single home or multicast to multiple homes;
8. If the IP Video stream is being multicast, the number of homes receiving the particular replication that the home of interest is receiving;
9. If the IP Video stream is being multicast, the number of other replications of the same stream that might be accessible to the home of interest;
10. If there are other replications of a multicasted IP Video stream that are on the channels accessible to the home of interest, identification of the content and resolution and bit-rate of those IP Video streams;
11. Within any congested channel, the priority of the data streams (HSD and IP Video and VoIP) that are competing for the congested bandwidth;
12. A number of viewers that are receiving each data stream;
13. A type of display device is being used by each recipient of each IP Video stream (e.g., this can be used to infer whether a viewer will be greatly impacted by throttling of the stream);
14. A service level agreement (SLA) that has been reserved by each home within the service group;
15. Identification of the user's billing payment status (e.g., up-to-date, delinquent, etc.);
16. Identification of the minimal quality or resolution or bit-rate for the IP video stream that is acceptable for each type of client device, and the type of client devices that are receiving each IP video stream;
17. Identification of the maximum bandwidth that can be carried in the user's home network;
18. Identification of IP video stream movements have been initiated by CMTS or other network components equipment to load-balance the loads (e.g., which would change the bandwidth utilizations on all of the channels in the last mile network).

If this information is not made available to a control element that triggers the adaptive streaming changes within the adaptive SHT system, then the decisions can be made by the simple video client devices in adaptive SHT systems that exist today. In particular, such IP video client software element will monitor the bandwidth and/or arrival times of packets in its unique IP video stream and make decisions on throttling without knowing what is causing bandwidth changes or what triggering decisions are being made by the other video clients whose IP video streams are competing for the same bandwidth capacity. However, based upon the above disclosure, it should be apparent that these types of decisions (which are made without any knowledge of the information in the above list) can be sub-optimal.

For example, using the simple triggering mechanisms currently used in IP video clients (without the assistance of the global information identified in the above list), all or most of the different video clients might recognize congestion at essentially the same moment in time. This can result in multiple IP video clients choosing to throttle the bit-rates of their IP video streams downward at essentially the same moment in time. This may lead to a very large decrease in the total bandwidth on their shared channels. This decrease in total bandwidth on the shared channels can then cause multiple IP video clients to recognize the increase in available bandwidth capacity at essentially the same moment in time. This can result in multiple of the IP video clients to throttle the bit-rates of their IP video streams upward at essentially the same moment in time. This cycle may repeat itself over and over again, with the end result being that all or most of the IP video clients oscillate back and forth between transmitting at a rate that is too high (causing congestion) and transmitting at a rate that is too low (leaving unused channel bandwidth). This operation is undesirable because it is an inefficient use of the channel bandwidth, and results in many of the IP video viewers to experience frequent resolution changes in the rendered video images.

Another example of sub-optimal performance can occur due to the IP video client throttling its bandwidth even when the stream is a high-priority IP video stream that is experiencing congestion from the aggregated bandwidth cause by many low-priority IP video streams. Thus, a high-priority stream destined for a large-screen television might be throttled to a lower resolution even when the congestion was actually being created by a large number of low-priority IP video streams, e.g., destined for smartphones. In a more efficient solution, only the low-priority, smart-phone-destined streams would be throttled and the high-priority television-destined stream would remain un-throttled. However, without the SHT client being cognizant of the nature of other streams and the priorities of the various streams that are competing for bandwidth and causing the congestion, the IP video client for the large-screen television would like make an inefficient decision.

Another example of sub-optimal performance can occur when different adaptive streaming triggering algorithms (with different trigger levels) are used by different IP video clients within a service group. For example, this might result when different IP video clients have software loads from the same central source, but the loads have aged differently. Because triggering algorithms can be modified from time to time and may be distributed to IP video clients in a somewhat haphazard fashion (e.g., when the various customers re-boot their respective client(s)), different triggering algorithms can exist in different IP video clients. In another example, differing triggering algorithms can originate from different sources (manufacturers) being used within the same service group. In whatever way the situation develops, the existence of different adaptive streaming triggering algorithms can cause serious problems. For example, one algorithm may be benevolent, throttling down rapidly when there is a slight hint of bandwidth congestion, and throttling upward slowly only when certain that there is adequate bandwidth. Another algorithm may be selfish, throttling up rapidly whenever it can, and throttling down only after experiencing bandwidth congestion for a lengthy period of time. If an IP video client containing a benevolent algorithm was paired on a channel with an IP video client containing a selfish algorithm, it should be apparent that the selfish IP video client typically receives higher-quality, higher-resolution, higher-bit-rate video streams and the benevolent IP video client typically receives lower-quality, lower-resolution, lower-bit-rate video streams. This result will likely occur even if the viewers behind the benevolent IP video client were high priority subscribers with large-screen televisions while the viewers behind the selfish IP video client were low priority subscribers with only smart-phones for viewing the video.

Another example of sub-optimal performance can occur when the modems within many homes of a service group all tune to the same sub-set of downstream channels that are available within the service group and try to simultaneously access their desired IP video streams. Assume that there are other downstream channels that are available for use but remain unused within the service group because no modems have tuned to them. Assume that bandwidth congestion develops on those few selected channels and the adaptive streaming triggering algorithms in each IP video client throttle down the quality, resolution, and bit-rate of all of the IP video streams sharing those downstream channels. Because the aggregate IP video bandwidth has been throttled to a lower level, the central facility equipment (such as a CMTS) that would normally monitor the bandwidth and load-balance the modems across to the unused channels (e.g., when congestion occurs) might not perform the load-balancing procedures. Thus, all of the modems carrying low-quality, low-resolution, low-bit-rate IP video streams to their viewers are left in that undesirable state on the few selected downstream channels even though other unused downstream channels are idle and available for use.

Another example of sub-optimal performance can occur if the SHT systems permit the viewers to use start-over features and trick-mode features, such as pause, rewind, and fast-forward. The issues stem from the need to quickly pre-load the client's playback buffer with one or several segments to allow a new session (or piece of a session) to start. This pre-loading occurs at a bit-rate that can greatly exceed the normal bit-rate of the IP video stream, so every time a viewer uses one of these features, there may be a sudden and transient burst of bandwidth created as the IP video content is rapidly loaded into the IP video client. If the fast re-load is not provided by the SHT system, then the playback will start or resume only after some time has passed. This condition can be undesirable to the viewers. In a bandwidth-constrained environment, the frequent re-filling of play-out buffers and the resultant temporarily increase of the demanded bandwidth by some client devices may have negative effect on performance of other client devices by consuming all of the available bandwidth and causing 'starvation' with the IP video client's buffers. When the adaptive streaming triggering algorithms in the IP video clients recognize the starvation within their buffers, it may cause them to throttle the bandwidth on their IP video stream to a lower quality, lower resolution, lower bit-rate level. As a result, many viewers can experience unexpected and annoying changes of video quality due to the periodic usage of start-over features or trick-mode features within the SHT environment. To avoid this flapping of the IP video quality, the service provider may choose to over-provision the bandwidth for each subscriber and incur higher delivery costs. In extreme cases, even generous bandwidth over-provisioning may not address the issues caused by SHT flows to devices with very deep buffers that play-out high definition content. Moreover, bandwidth over-provisioning is inefficient and impacts network operator's return on investment. In a better managed system, the adaptive streaming triggering algorithms can recognize the potential for bandwidth congestion and also recognize that start-over or trick-mode features are being initiated and manage the total bandwidth by throttling the bandwidth of the requested bursts. However, existing triggering algorithms do not include knowledge about global network bandwidth usage and the likelihood of congestion if/when trick modes are enabled.

Another example of sub-optimal performance can occur because of a mis-match between the last mile network bandwidth capacity, the home network bandwidth capacity, and the bandwidth for a particular IP video stream being requested by the IP video client. For example, assume that the last mile network can support a 10 Mbps stream but the home network can only support a 1 Mbps stream. Assume that IP video client receives a manifest file with the options to request an 8 Mbps IP video stream and a 4 Mbps IP video stream. While neither of those IP video stream would be transportable across the home network's 1 Mbps bandwidth limit, existing triggering algorithms for the IP video client's adaptive streaming are not cognizant of the home network's limiting bandwidth. Thus, existing triggering algorithms will attempt to receive the video stream at a higher bandwidth. In particular, it will likely request the lowest bit-rate stream that it sees in the manifest file (the 4 Mbps stream) and the central facility will deliver that IP video stream over the last mile network into the home. However, many of the packets from the IP video stream will likely be dropped in overflowing buffers within the home network equipment. As a result, bandwidth on the last mile network was wasted due to the fact that the IP video client did not have information about the bandwidth capacity of the home network.

Each of the above scenarios create undesirable operating conditions, and these conditions are a direct result of existing adaptive streaming triggering algorithms that are not cognizant of information about the available capacity, the used bandwidth, the identity of the interacting IP video streams that are causing congestion, the nature (priority or service class) of the interacting IP video streams, the capabilities of the client display devices, etc. If such information were accessible to the entity that is in charge of making throttling decisions, then more intelligent throttling decisions could be made within the adaptive streaming system.

The previously-described adaptive SHT systems (e.g., on-demand SHT systems and live streaming SHT systems) were implemented using HTTP. As a result, they are layered on top of the TCP protocol, which is implemented for a unicast, point-to-point connection between the source server and the IP video client. Thus, in contrast to a managed, multi-subscriber environment (e.g., CATV distribution systems, telco distribution systems, etc.) where common linear, live streaming content can be simultaneously accessed by multiple subscribers, the SHT systems described above typically provide service to multiple subscribers using many unicast, point-to-point connections. However, in situations where the service providers' delivery bandwidth capacity within the last mile delivery system is constrained by the number of channels dedicated to this IP video service, the service providers may be interested in more efficient techniques to deliver the linear, live streaming video content to the multiple subscribers who are viewing the same video content.

One popular technique that can help to minimize the number of required parallel connections and the overall bandwidth needed for IP video is based on the use of IP multicasting. Using the multicasting approach, all viewers who are interested in gaining access to a particular piece of linear, live video content communicate with the service provider's central facility (head-end or central office) and send a request to join the multicast group that is receiving the video content.

This request can be sent via standards-based protocol messages (such as IGMP for IPv4 multicast or MLD for IPv6 multicast) or can be sent via proprietary message exchanges between the IP video client and the central facility. Either way, once the central facility receives the requests, the equipment can deliver a single multicast, UDP-based packet stream (carrying the requested video segments) on one or more downstream channels directed at any service group where a requesting viewer resides. Replications of the multicast, UDP-based packet stream occur close to the viewers' locations. This tends to conserve bandwidth in the network. For a point-to-multipoint distribution system such as the one used in a cable TV DOCSIS environment, the use of multicast IP is very efficient, because only a single multicast stream needs to be transmitted down a particular branch of the Hybrid-Fiber Coaxial network and all of the viewers on that particular branch (within the service group) who desire access to the multicast stream can receive a copy of the single stream by simply making a copy of the UDP-based packets as they pass the branch.

However, it would not be desirable to allow one viewer of a particular multicast stream to change the resolution and bit-rate of the multicast stream that many other viewers are accessing, because it is unlikely that all of the users can tolerate identical reductions of their video quality. While smart-phone viewers receiving a multicast video stream might be satisfied to reduce their resolution and bit-rate, large-screen television viewers receiving the same multicast video stream may not be satisfied with a lower resolution.

Thus, adaptive rate management (as described above for the unicast cases) is not typically used as a part of these multicast IP distribution systems. Instead, a multicast UDP-based stream is usually delivered to the viewers using a single high-resolution version of the video content to ensure that even the most demanding receiving elements (such as large-screen televisions) will receive an adequate resolution. It should be noted that this particular approach to the delivery of multicast IP video could lead to inefficient bandwidth utilization on the last-mile delivery network, because if all of the viewers of an IP video multicast stream are using small-screen devices (such as smart-phones), then the high-resolution, high-bit-rate stream that is multicasted down to all of the smart-phones would consume more bandwidth than a low-bit-rate stream that could have been transmitted in its place (if intelligent adaptive rate management were permitted).

Individual IP video client devices can request a version of the multicast IP video stream that is optimal for their particular viewing screen (e.g., smart-phones request low-resolution streams in an attempt to reduce total bandwidth usage, large-screen televisions request high-resolution streams to match the requirements of their viewers), but this activity can result in two separate multicast IP video streams (one low-resolution and one high-resolution) being sent to the same service group when a single high-resolution stream might have suited all of the recipients.

The above scenarios can operate to create undesirable operating conditions and wasted bandwidth for the multicast IP video world, which results in the nonuse of adaptive streaming in the multicast IP video world. Adaptive streaming is not used because the adaptive streaming triggering algorithms are not cognizant of more global information about the available capacity, the used bandwidth, the identity of the interacting IP video streams that are causing congestion, the nature (priority or service class) of the interacting IP video streams, the capabilities of the client display devices, etc. As a result, the application of existing adaptive streaming throttling algorithms (inside of each IP video client) would likely result in some or all of the undesirable conditions listed above. If all of this information was accessible to the entity that is making throttling decisions, then more intelligent throttling decisions can be made even for multicast IP video streams.

In some implementations, information about the network from external sources can be used to dynamically manage and optimize the quality/resolution/bit-rate levels for each of the many IP video streams that are being simultaneously transmitted to IP video clients in a common service group. Implementing a control algorithm with more knowledge about the network's unicast SHT IP video traffic streams can operate to override the individualistic behaviors that are typical of the localized IP video client algorithms of today. Due to the informed nature of the adaptive streaming system using such information, it can yield more efficient bandwidth utilization and higher quality of experience (QoE) levels for the subscribers. The implementation of a more informed control algorithm can permit even multicast IP video traffic streams to have associated quality/resolution/bit-rate levels to be dynamically managed and optimized.

IP video rate management systems based on global system information can be implemented in many ways. We will describe some of these implementations below. However, the implementations generally share a few common sub-systems and characteristics. These are described in this section.

The SHT system using global information to manage the IP video streams can include one or more of:

1. the IP video clients that receive and render the IP video streams;
2. the home network that connects IP video client devices (IP STBs, network-enabled televisions, PCs, tablets, smart-phones, PDAs, etc.) with the modem;
3. the modems that tune to appropriate channels within the last mile network to receive the IP video streams and inject them into the home network;
4. the last mile network that provides one or more channels of connectivity between the service provider's central facility (ex: head-end or central office) and the modems in the subscriber homes;
5. the network components (ex: routers, CMTSs, etc.) that deliver the IP video streams to the last mile network;
6. the IP video servers that store and provide the IP video stream segments (which can include both origin servers and edge cache servers);
7. the back-office network that provides connectivity between the IP video servers and the network components and the other management elements in the system;
8. the bandwidth statistics management elements that are employed to gather and store usage and capacity statistics for the channels on the last mile network;
9. the user management modules that are employed to gather and store information about each IP video client's capabilities, billing status, desired performance ranges, Service Level Agreements (priority levels). tuner capabilities and number of supported tuners on the associated modem, home network bandwidth capacities, etc.;
10. the topology management modules that are employed to gather and store information about the possible connections between each of the elements in the system—including the description of the last mile network and the description of the number and identity of channels that are available to carry IP video stream to each service group (group of homes) in the network and the description of the number and identity of modems that reside in each service group;

11. the session management elements that are employed to gather and store information about the current IP video sessions being transmitted to each IP video client (including information on the permissible resolutions, the desired resolution ranges, the channels used to transport the particular session;
12. the policy rules/triggering engine that performs one or more of the following actions:
    a. stores the rules (as defined by the service provider) for changing channels and triggering quality/resolution/bit-rate changes on IP video streams;
    b. accesses the databases in the bandwidth statistics management elements and the user management modules and the topology management modules and the session management elements to collect pertinent information;
    c. applies the rules for managing adaptive streaming triggers and channel changes for IP video sessions propagating over the last mile network;
    d. initiates adaptive streaming triggers on individual IP video streams that were selected by the engine;
    e. intitiates channel changes to get tuners on individual modems to re-tune to different channels within the last mile network; and
    f. initiates steering of IP video streams to particular sets of channels in the last-mile network; and
13. the communication protocols used to provide appropriate communication for messages sent between all of the sub-systems listed above.

These sub-systems are illustrated in FIG. 1. The sub-systems are described (and illustrated) in FIG. 1 as if they were separate and unique entities. It should be understood that various of these sub-systems can be integrated within a single box. (Note: As an example, one implementation might combine the bandwidth statistics management element, the user management module, the topology management module, and the session management element into a single box, which might be called something like the IP video controller). Thus, it should be clear that many different implementations of the proposed system are permissible. Several of these implementations are outlined below, but it should be understood that these are merely examples, and other implementations are also permitted.

General Operation of the Sub-Systems to Intelligently Manage Unicast IP Video Traffic Streams The sub-systems described in the common sub-systems and characteristics section can interact with one another in distinct ways to generate the global state information about the end-to-end SHT system. These sub-systems can also interact with one another in distinct ways to initiate intelligent control and management over the unicast IP video traffic streams.

IP video clients $125a$-$n$ and modems $120a$-$n$ can typically be deployed inside of homes $105a$-$n$. The capabilities of the IP video clients $125a$-$n$ (ex: display size of connected devices, desired resolutions), the capabilities of the home network $130a$-$n$ (ex: maximum permissible bandwidth), and the capabilities of the modem $120a$-$n$ (ex: number of tuners supported to connect to channels) could be recorded by installers and can be manually entered into a database at one or more user management modules. Alternatively, the information could be acquired by an advanced modem (such as but not limited to a media gateway) using device discovery techniques and bandwidth probing techniques throughout the home, and that information could then be automatically transmitted to the database at one or more user management modules $135$.

The central facility $115$ typically can be equipped with an IP video server $100$ that is loaded with the IP video content that can be requested via HTTP GET requests from the video clients $125a$-$n$.

The central facility $115$ can also be equipped with a CMTS $140$ that transmits the traffic onto the channels of the last mile network. The particular channels on the CMTS $140$ that are connected to particular service group, and the particular modems $120a$-$n$ and IP video clients $125a$-$n$ contained within that service group could be manually entered into a database within the one or more topology management module.

The central facility $115$ can also be equipped with policy rules/triggering engine $145$. In some implementations, the service provider can manually enter in their desired policy rules into this engine $145$. For example, the provider might specify the following rules be followed in the order of precedence shown:

Rule 1 (Highest precedence): IP video streams going to IP video clients $125a$-$n$ with large-screen televisions should be sent at 8 Mbps unless all other IP video flows for IP video clients $120a$-$n$ without large-screen televisions have been adaptively throttled to their lowest bandwidth levels and no more bandwidth exists to permit all of the programs to flow over the last mile network $150$;

Rule 2 (Medium precedence): IP video streams going to IP video clients $125a$-$n$ without large-screen televisions should be sent at the highest rate possible, but any of these streams can be adaptively throttled downward to a lower bandwidth level if no more bandwidth exists to permit all of the programs to flow over the last mile network $150$;

Rule 3 (Lowest precedence): If all IP video streams on a set of channels have been adaptively throttled down to their lowest permissible quality/resolution/bit-rate levels, then any IP video stream going to an IP video client without a large-screen television can be moved to a different channel (using DOCSIS DCC or DBC load-balancing operations) if another channel exists that has spare bandwidth . . . note that this may involve the CMTS $140$ steering the stream to a different channel and it also involve the modem $129a$-$n$ re-tuning one of its tuners to a different channel.

The CMTS $140$ can come on line and be loaded with topology information (either manually or by communicating with the topology management module $155$). As a result, it understands the nature of the connections within the last mile network $150$. It then begins to discover the identity (ex: IP addresses) of the modems $120a$-$n$ that are in each service group of the last mile network $150$ as the modems $120a$-$n$ go through a ranging/registration process whereby they communicate with the CMTS $140$. The CMTS $140$ also begins to discover the identity (ex: IP addresses) of the IP video clients $125a$-$n$ that are behind each modem $120a$-$n$. As a result, the CMTS $140$ begins to create a database with a detailed description of the network and the clients hanging off of that network.

The bandwidth statistics management module $160$ can begin probing one or more of the sub-systems connected to the last mile network $150$ to determine that amount of available bandwidth that is available going to each service group. These probes can be sent to the CMTS $140$ (which performs real-time measurements of the bandwidth on each of its attached channels) and they can also be sent to the modems $120a$-$n$ and the IP video clients $125a$-$n$ (which can perform real-time measurements of the bandwidth of the feeds directed at those sub-systems). As a result, the bandwidth statistics management module $160$ can provide an estimate of the available bandwidth on each of the channels going to each of the service groups in the system.

The session management module 165 in the central facility can be responsible for distributing the program list of available programs to the IP video client 125a-n using a communication protocol. Once the IP video client 125a-n receives the program list and displays it for the viewer, the viewer can select a program that they wish to receive and can send a request message for the program to session management module 165 in the central facility 115. The session management module 165 can record this request from the IP video client 125a-n in its database, along with details about the particular session (such as its permissible quality/resolution/bit-rate levels).

The session management module 165 can communicate with the topology management module 155 to determine where a particular requesting IP video client 125a-n resides within the network. In particular, the session management module 165 can access information regarding the service group where it resides, the last mile network 150 channels that are feeding that service group, etc.

The session management module 165 can also communicate with the user management module 135 to obtain information about this particular IP video client 125a-n, such as what types of display screens are connected to the client 125a-n.

The session management module 165 can periodically communicate with the bandwidth statistics management module 160 to obtain real-time readings of the bandwidth that is currently available on each of the channels that go to the client's 125a-n service group. These checks may indicate that there is enough spare bandwidth to support a high bit-rate feed or they may indicate that there is not enough spare bandwidth to support a high bit-rate feed. If not, then the policy rules engine 145 can be used to determine how to respond to the situation. It might result in a throttling down of the bit-rate for this particular IP video session. It might also result in a throttling down of the bit-rate for another IP video session before setting up this session. It might also result in the movement of an existing IP video feed to a new set of channels if there is adequate bandwidth on the other channels. The policy rules engine 145 can complete its analysis and yield its results, indicating what changes to make. The triggering portion of the policy rules/triggering engine 145 can determine what SHT quality/resolution/bit-rate level should be used for the video feed. While making its decisions, the engine 145 can incorporate many global pieces of information, including the current bit-rates of more than one (or even all) active IP video feeds as well as the type of display device that is connected to each IP video client 125a-n. These factors can be used by the adaptive streaming system as it analyzes one or more of the policy rules. These results can be communicated back to the session management module 165.

The session management module 165 can then communicate a message to the CMTS 140 to create a service flow with the specific amount the bandwidth requested on the channels for transmitting the newly-requested IP video stream to the requesting client 125a-n. This message can include the identity of the IP video client 125a-n (which the CMTS 140 could recognize from its database) and could include a bandwidth value that could support the maximum value expected for the IP video stream.

The session management module 165 can then communicate back down to the IP video client 125a-n, informing the client that it is now enabled to receive its unicast SHT IP video feed. We can assume that the client will begin making its HTTP GET requests for the video stream from the IP video server 100.

At this point, global information can be used to change the manner in which the SHT system operates. In a normal SHT system, the IP video client 125a-n would begin to access the particular bit-rate feeds using HTTP GETS based on its own internal adaptive streaming triggering algorithm and based only on local information. However, the policy rules/triggering engine 145 has already used global information (including the current bandwidths of all IP video feeds, whether IP video clients are attached to large-screen televisions or not, etc.) to create a more-informed decision about the bandwidth that should be associated with this IP video stream. The results of the policy rules/triggering engine 145 calculations can be used in any one of several ways:

1. The resulting bit-rate from the policy rules/triggering engine 145 can be communicated directly from the session management module 165 to the IP video client 125a-n such that the IP video client 125a-n uses that particular bit-rate when it performs its HTTP GETs. This approach has lower complexity compared to some other approaches. While this approach generally could be implemented using proprietary code within the IP video client 125a-n, service providers may want to be compatible with standard, off-the-shelf IP video client software. To allow the system to work with standard, off-the-shelf IP video client software, approaches (2) and (3) directly below may be used instead.
2. The resulting bit-rate from the policy rules/triggering engine 145 can be communicated directly from the session management module 165 to the CMTS 140 (or another networking element in the path of the HTTP GETs) such that the CMTS 140 can over-write the URL within the HTTP GETs from the IP video client 125a-n with the URL of the bit-rate stream identified by the policy rules/triggering engine 145. This approach can be implemented by adding new code to the CMTS 140 (or another device in the path of the HTTP Gets) to perform the over-write function. It should be noted that service providers can still use standard, off-the-shelf IP video client software with this approach.
3. The resulting bit-rate from the policy rules/triggering engine 145 can be communicated directly from the session management module 165 to the IP video server 100 such that the IP video server 100 becomes IP video client aware and responds to HTTP GETs from the particular IP video client 125a-n with the IP video stream specified by the policy rules/trigger engine 145 (and not with the IP video stream specified by the URL in the HTTP GETs). This approach can be implemented by adding new code to the IP video server 100 to perform the client-aware substitution function. It should be noted that service providers can still use standard, off-the-shelf IP video client software with this approach.

The actions described above can effectively over-ride the normal adaptive streaming triggering algorithms within the IP video client using the more informed algorithms of the policy rules/triggering engine 145.

The triggering engine 145 can be called upon to make new decisions about the bandwidth of IP video streams whenever a new IP video stream flow is initiated by any IP video client or whenever an existing IP video stream flow is halted. The triggering engine 145 can propose the bit-rate for the new stream as well as changes to the bit-rates on already-existing streams in the network. The triggering engine can also propose the movement of IP video flows to different channels if that is implicated by the policy rules.

General Operation of the Sub-Systems to Intelligently Manage Multicast IP Video Traffic Streams The sub-systems identified in the common sub-systems and characteristics section above can interact with one another in distinct ways to generate the global state information about the end-to-end SHT system, and they also can interact with one another in distinct ways to initiate intelligent control and management over the multicast IP video traffic streams.

IP video clients 125a-n and modems 120a-n can be deployed inside of homes. The capabilities of the IP video clients 125a-n (ex: display size of connected devices, desired resolutions), the capabilities of the home network 130a-n (ex: maximum permissible bandwidth), and the capabilities of the modem 120a-n (ex: number of tuners supported to connect to channels) can be recorded by installers and manually injected into a database at one or more user management modules 135. Alternatively, the information could be acquired by an advanced modem (such as, e.g., but not limited to, a media gateway) using device discovery techniques and bandwidth probing techniques throughout the home, and that information could then be automatically transmitted to the database at one or more user management modules 135.

The central facility 115 can be equipped with an IP video server 100 which can be loaded with the IP video content that is being live streamed (with many resolutions) from a transcoder.

The central facility could also be equipped with a CMTS 140 that transmits the traffic onto the channels of the last mile network 150. The particular channels on the CMTS 140 that are connected to particular service group, and the particular modems and IP video clients contained within that service group could be manually entered into a database within the one or more topology management module.

The central facility can also be equipped with a policy rules/triggering engine 145. The service provider can manually enter in their desired policy rules into this engine 145. For example, they might desire that the following rules be followed in the order of precedence shown:

Rule 1 (Highest precedence): IP video multicast streams going to IP video clients with large-screen televisions can be sent only at 8 Mbps . . . if no more bandwidth exist to permit all of the programs to flow over the last mile network, then do not set up the new IP video multicast stream;

Rule 2 (Next Highest precedence): IP video unicast streams going to IP video clients with large-screen televisions should be sent at 8 Mbps unless all other IP video flows for IP video clients without large-screen televisions have been adaptively throttled to their lowest bandwidth levels and no more bandwidth exists to permit all of the programs to flow over the last mile network;

Rule 3 (Medium precedence): IP video streams (unicast or multicast) going to IP video clients without large-screen televisions should be sent at the highest rate possible, but any of these streams can be adaptively throttled downward to a lower bandwidth level if no more bandwidth exists to permit all of the programs to flow over the last mile network; and Rule 4 (Lowest precedence): If all IP video streams on a set of channels have been adaptively throttled down to their lowest permissible quality/resolution/bit-rate levels, then any IP video stream going to an IP video client without a large-screen television can be moved to a different channel (using DOCSIS DCC or DBC load-balancing operations) if another channel exists that has spare bandwidth . . . note that this may require the CMTS to steer the stream to a different channel and it also may require the modem to re-tune one of its tuners to a different channel.

The CMTS 140 can come on line and is loaded with topology information (either manually or by communicating with the topology management module 155). As a result, it understands the nature of the connections within the last mile network 150. It then begins to discover the identity (ex: IP addresses) of the modems 120a-n that are in each service group of the last mile network 150 as the modems go through a ranging/registration process whereby they communicate with the CMTS 140. The CMTS 140 also begins to discover the identity (ex: IP addresses) of the IP video clients 125a-n that are behind each modem 120a-n. As a result, the CMTS 140 begins to create a database with a detailed description of the network and the clients hanging off of that network.

The bandwidth statistics management module 160 can then begin probing one or more of the sub-systems connected to the last mile network 150 to determine that amount of available bandwidth that is available going to each service group. These probes can be sent to the CMTS 140 (which performs real-time measurements of the bandwidth on each of its attached channels) and they can also be sent to the modems 120a-n and the IP video clients 125a-n (which can perform real-time measurements of the bandwidth of the feeds directed at those sub-systems). As a result, the bandwidth statistics management module 160 can observe the available bandwidth on each of the channels going to each of the service groups in the system.

The session management module 165 in the central facility can be responsible for distributing the program list of available programs to the IP video client 125a-n using a communication protocol. Once the IP video client receives the program list and displays it for the viewer, the viewer can select a multicast program that they wish to receive and can send a request message for the program to session management module 165 in the central facility. The session management module 165 can record this request from the IP video client in its database, along with details about the particular session (such as its permissible quality/resolution/bit-rate levels).

The session management module 165 can then communicate with the topology management module 155 to determine where this particular requesting IP video client 125a-n resides within the network. In particular, it might access information regarding the service group where the client resides, the last mile network channels that are feeding that service group, etc.

The session management module 165 can also communicate with the user management module 135 to obtain information about this particular IP video client, such as what types of display screens are connected to the client.

The session management module 165 can periodically communicate with the bandwidth statistics management module 160 to get real-time readings of the bandwidth that is currently available on each of the channels that go to the client's service group. These checks may indicate that there is enough spare bandwidth to support a high bit-rate feed or they may indicate that there is not enough spare bandwidth to support a high bit-rate feed. If not, then the policy rules engine 145 can be used to determine how to respond to the situation. The checks can result in a throttling down of the bit-rate for this particular IP video session. The checks could also result in a throttling down of the bit-rate for another IP video session before setting up this session. The checks can also result in the movement of an existing IP video feed to a new set of channels if there is adequate bandwidth on the other channels. The policy rules engine 145 can complete its analysis and yield its results, indicating what changes to make. The triggering portion of the policy rules/triggering engine 145 can be used determine what SHT quality/resolution/bit-rate level should be used for the video feed. While making its decisions, the engine 145 incorporates many global pieces of information, including the current bit-rates of more than one (or even all) active IP video feeds as well as the type of display device that is connected to each IP video client 125a-n. These factors can be used by the engine as it analyzes the policy rules. These results can be communicated back to the session management module 165.

The session management module 165 can contain associations between the various bit-rate versions of programs and the multicast group IP address associated with that program.

The session management module 165 can then communicate a message to the IP video server 100 instructing it to begin sending UDP packets containing the multicast IP video feed out of its port into the back-office network.

The session management module 165 can then communicate a message to the CMTS 140 to create a service flow and a multicast replication with the specific amount of bandwidth requested on the channels for transmitting the newly-requested multicast IP video stream to the requesting client. This message can include the identity of the IP video client (which the CMTS should recognize from its database) and can include a bandwidth value that can support the maximum value expected for the IP video stream.

The session management module 165 can then communicate back down to the IP video client with the multicast group IP address that it will receive, telling it that it is now enabled to receive its multicast SHT IP video feed. The IP video client 125a-n may then send an IGMP Join message to the CMTS 140 indicating the particular multicast group IP address, and the CMTS 140 can propagate that Join message as a PIM-SSM message out of its north-bound interface into the back-office network. At that point, the desired multicast IP video packets could begin flowing from the IP video server 100 to the CMTS 140 and then on to the modem 120a-n and IP video client 125a-n.

At this point, global information can be used to change the manner in which the multicast system operates. In a typical multicast system, the IP video client 125a-n can begin to receive the bit-rate feed that it asked for, and that bit-rate might never be changed by the IP video client 125a-n or by the server 100. However, in the approach described herein, the policy rules/triggering engine 145 has already used global information (including the current bandwidths of all IP video feeds, whether IP video clients are attached to large-screen televisions or not, etc.) to create a more-informed decision about the bandwidth that should be associated with this IP video stream. The results of the policy rules/triggering engine 145 calculations can be used in any one of several ways:

1. The resulting bit-rate from the policy rules/triggering engine 145 can be communicated directly from the session management module 165 to the IP video client 125a-n such that the IP video client 125a-n uses that particular bit-rate (and its associated multicast Group IP address) when it performs its Join. This approach has lower complexity compared to some other approaches. While this approach could be implemented using proprietary code within the IP video client 125a-n, service providers may want to be compatible with standard, off-the-shelf IP video client software. To allow the system to work with standard, off-the-shelf IP video client software, approach (2) directly below can be used instead.

2. The resulting bit-rate from the policy rules/triggering engine 145 can be communicated directly from the session management module 165 to the CMTS 140 (or another networking element in the path of the HTTP GETs) such that the CMTS 140 can over-write the multicast group IP address in the Join message from the IP video client with the multicast group IP address identified by the policy rules/triggering engine 145. This approach can be implemented by adding new code to the CMTS 140 (or another device upstream of the CMTS 140) to perform the over-write function prior to sending the PIM-SSM message upstream from the CMTS 140. It should be noted that service providers can still use standard, off-the-shelf IP video client software with this approach.

The actions described above may effectively over-ride the normal method for selecting a bit-rate for a particular multicast stream. In addition, the more informed algorithms within the policy rules/triggering engine 145 can be used to trigger dynamic changes in the quality/resolution/bit-rate of the multicast feed at suitable points in time when the conditions (policy rules) permit it. In the non-limiting example above, policy rules cause the multicast IP video feed only to be reduced in bit-rate below the 8 Mbps rate if all of the recipients accessing the multicast IP video feed are IP video clients without large-screen televisions. This type of determination was made possible by the use of the policy rules/triggering engine 145 that has global knowledge about the system.

The triggering engine 145 can be called upon to make new decisions about the bandwidth of IP video streams when a new IP video stream flow is initiated by an IP video client 125a-n or when an existing IP video stream flow is halted. The triggering engine 145 can propose the bit-rate for the new stream as well as changes to the bit-rates on already-existing streams in the network. The triggering engine 145 can also propose the movement of IP video flows to different channels if that is required by the policy rules.

Figure 2:
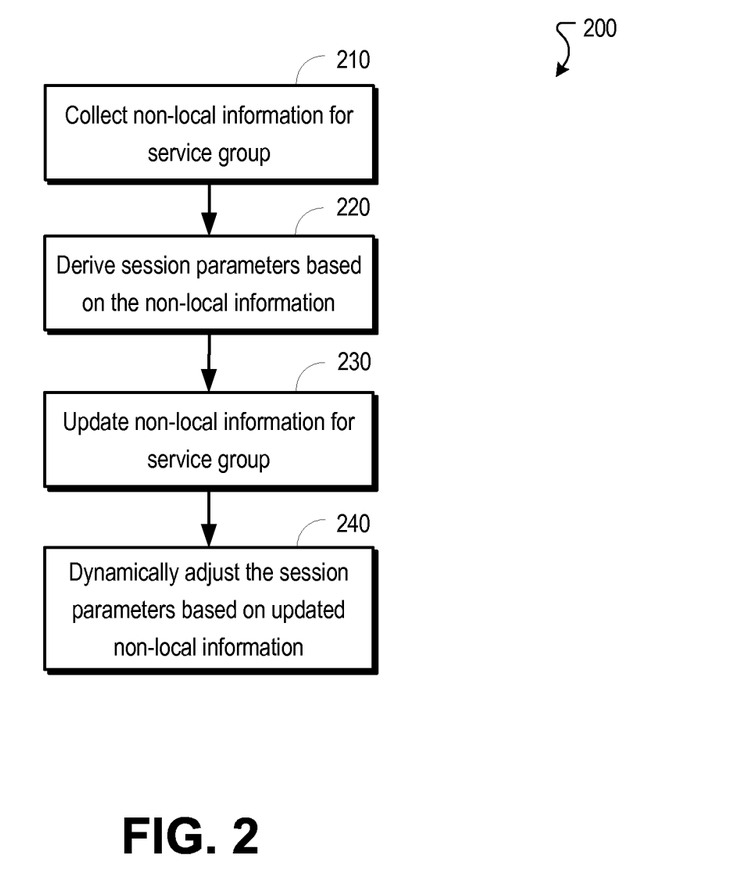
FIG. 2 is a flowchart illustrating an example process operable to provide improved adaptive streaming using non-local information.

FIG. 2 is a flowchart showing an example process 200 for adaptive streaming using non-local information. The process 200 starts at stage 210, where non-local information associated with a service group is collected. The non-local information can be collected, for example, by a network management system (e.g., including one or more of a an IP video server 100, user management module 135, a CMTS 140, a policy rules/triggering engine 145, a topology management module 155, a bandwidth statistics module 160, a session management module 165 of FIG. 1, among others). In various implementations, the network management system can collect any of: customer site information, network topology information, policy rules, bandwidth information and session information, among others and combinations thereof. Customer site information can include, e.g., video client capabilities of IP video clients in the service group, capabilities of home networks in the service group, and modem capabilities of modems within the service groups. Network topology information can include channel information identifying a plurality of channels serving the service group, and modem and video client information operable to tie the modem capability and video client information to the service group. Policy rules can include rules identifying the minimum or maximum parameters associated with, e.g., subscribers, equipment, service level agreements, etc. Bandwidth information can include, e.g., statistics identifying channel load, network/link capacity, usage, etc. Session information can include, e.g., program identification and permissible quality, resolution and bit rate levels associated with various sessions. It should be understood that in various implementations, any of the components of the network management system can be co-located within the same device or located within separate hardware devices.

At stage 220, session parameters are derived based upon collected non-local information. The session parameters can be derived, for example, by a session management module (e.g., session management module 165 of FIG. 1).

At stage 230, the non-local information is updated. The non-local information can be updated, for example, by a network management system (e.g., including one or more of a an IP video server 100, user management module 135, a CMTS 140, a policy rules/triggering engine 145, a topology management module 155, a bandwidth statistics module 160, a session management module 165 of FIG. 1, among others).

At stage 240, the session parameters are dynamically adjusted based upon the updated non-local information. The session parameters can be dynamically adjusted, for example, by a session management module (e.g., session management module 165 of FIG. 1). In some implementations, the session parameters for existing sessions can be updated periodically. In other implementations, the session parameters for existing sessions can be updated each time a new session is established. In still further implementations, the session parameters for existing sessions can be updated periodically and when new sessions are established.

Figure 3:
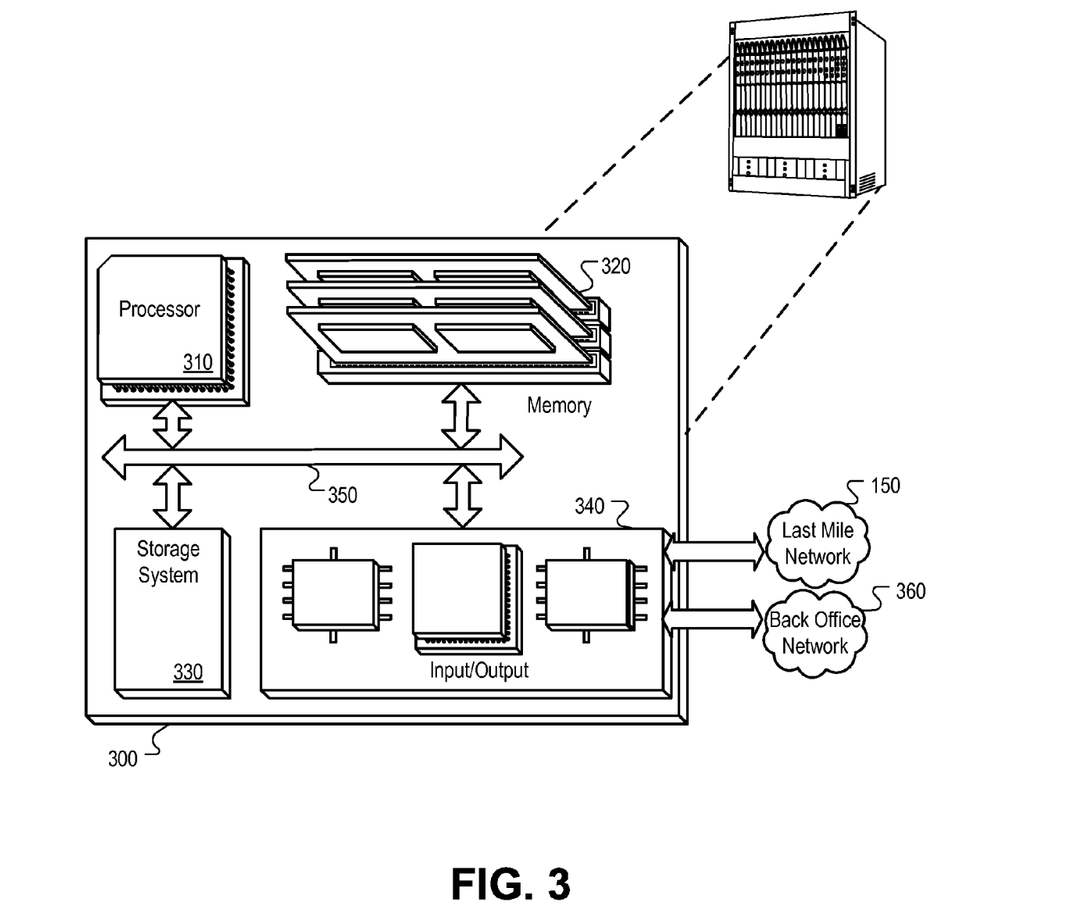
FIG. 3 is a block diagram of a network management system to provide adaptive streaming using non-local information.

FIG. 3 is a block diagram illustrating an example network management system operable to provide adaptive streaming using non-local information. The network management system 300 operable to provide OBI detection and avoidance using upstream channel leashing can include a processor 310, a memory 320, a storage device 330, and an input/output device 340. Each of the components 310, 320, 330, and 340 can, for example, be interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330. The processor 310 can be a complex of one or more processors.

The memory 320 stores information within the device 300. In one implementation, the memory 320 is a computer-readable medium. In one implementation, the memory 320 is a volatile memory unit. In another implementation, the memory 320 is a non-volatile memory unit.

In some implementations, the storage device 330 is capable of providing mass storage for the device 300. In one implementation, the storage device 330 is a computer-readable medium. In various different implementations, the storage device 330 can, for example, include a hard disk device, an optical disk device, flash memory or some other large capacity storage device.

The input/output device 340 provides input/output operations for the device 300. In one implementation, the input/output device 340 can include one or more of a wireless interface, last mile network 150, back office network 360, such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices, as well as sending communications to, and receiving communications from various networks.

The improved adaptive streaming systems described in this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
   collecting customer site information associated with customers within a service group;
   collecting network topology information for the service group;
   receiving policy rules associated with the service group;
   collecting bandwidth usage information on one or more channels assigned to the service group;
   collecting session information associated with established sessions with the service group;
   specifying quality, resolution and bit rate levels associated with each of the sessions destined for the service group, the quality, resolution and bit rate levels being derived based on customer site information, network topology information, policy rules, bandwidth information and session information associated with the service group; and
   dynamically adjusting quality and path of each individual IP video stream provided over data over cable service interface specification (DOCSIS) channels based upon collected customer site information, network topology information, policy rules, bandwidth information and session information, the quality and path adjustments to each individual IP video stream being performed on a per session basis, in order to provide adequate quality of experience levels to each receiver in the service group.

2. The computer-implemented method of claim 1, wherein the customer site information includes video client capabilities of IP video clients in the service group, capabilities of home networks in the service group, and modem capabilities of modems within the service groups.

3. The computer-implemented method of claim 1, wherein the network topology information includes channel information identifying a plurality of channels serving the service group, and modem and video client information operable to tie the modem capability and video client information to the service group.

4. The computer-implemented method of claim 3, wherein the network topology information is collected by a cable modem termination system.

5. The computer-implemented method of claim 1, wherein the policy rules include information identifying the types of streams that should be provided based upon user equipment.

6. The computer-implemented method of claim 1, further comprising:
   probing a sub-net associated with the service group;
   wherein collecting the bandwidth usage information comprises collecting results from probing the sub-net associated with the service group.

7. The computer-implemented method of claim 1, wherein session information includes a program identification and permissible quality, resolution and bit rate levels associated with each requested session.

8. The computer-implemented method of claim 1, further comprising communicating specified quality, resolution and bit rate levels to a session manager to start a session.

9. The computer-implemented method of claim 1, further comprising dynamically adjusting specified quality, resolution and bit rate levels for an existing session.

10. The computer-implemented method of claim 9, wherein the dynamic adjustment is made periodically or upon establishing a new session, and parameters resulting from the dynamic adjustment are communicated to a session manager to adjust the parameters associated with existing sessions.

11. A system, comprising:
- a user management module operable to collect customer site information, the customer site information identifying customers equipment within a service group;
- a network topology module operable to retrieve network topology information for the service group from a cable modem termination system;
- a policy engine operable to provide policy rules associated with the service group;
- a bandwidth usage module operable to probe the network to identify bandwidth usage information on one or more channels assigned to the service group;
- a session manager operable to receive session initiation requests and collect session information associated with established sessions with the service group;
- a triggering module operable to analyze the customer site information, network topology information, policy rules, bandwidth information and session information associated with the service group and to derive quality, resolution and bit rate levels for each of the established sessions based upon the analysis; and
- a cable modem termination system operable to make load balancing decisions based upon adjustment of quality and path of an IP Video stream provided over data over cable service interface specification (DOCSIS) channels based upon collected customer site information, network topology information, policy rules, bandwidth information and session information, the quality and path adjustments being performed on a per session basis and the load balancing decisions being performed on a per cable modem basis.

12. The system of claim 11, wherein the customer site information includes video client capabilities of IP video clients in the service group, capabilities of home networks in the service group, and modem capabilities of modems within the service groups.

13. The system of claim 11, wherein the network topology information includes channel information identifying a plurality of channels serving the service group, and modem and video client information operable to tie the modem capability and video client information to the service group.

14. The system of claim 11, wherein the policy rules include information identifying the types of streams that should be provided for each session based upon information from the user management module identifying user equipment.

15. The system of claim 11, wherein session information includes identification of a program and permissible quality, resolution and bit rate levels associated with each requested session.

16. The system of claim 11, wherein the triggering module is operable to communicate the derived quality, resolution and bit rate levels to a session manager to start a session.

17. The system of claim 11, wherein the triggering module and the session manager are operable to dynamically adjust the specified quality, resolution and bit rate levels for an existing session.

18. The system of claim 11, wherein the dynamic adjustment is made periodically or upon establishing a new session, and parameters resulting from the dynamic adjustment are communicated to a session manager to adjust the parameters associated with existing sessions.

19. A computer-implemented method, comprising:
- collecting non-local information identifying usage statistics associated with a network service group;
- deriving session parameters based on the non-local information to identify quality resolution and bit rate levels associated with each of a plurality of sessions associated with the network service group;
- updating the non-local information; and
- dynamically adjusting the session parameters based upon the updated non-local information, wherein an adjustment is made to quality and path of an IP Video stream provided over data over cable service interface specification (DOCSIS) channels based upon collected customer site information, network topology information, policy rules, bandwidth information and session information, the quality and path adjustments being performed on a per session basis.

20. The computer-implemented method of claim 19, wherein non-local information includes customer site information, network topology information, policy rules, bandwidth information and session information associated with the service group.

* * * * *